E. F. SÖRENSEN.
MEASURING DEVICE.
APPLICATION FILED MAY 26, 1910.
1,040,044.
Patented Oct. 1, 1912.
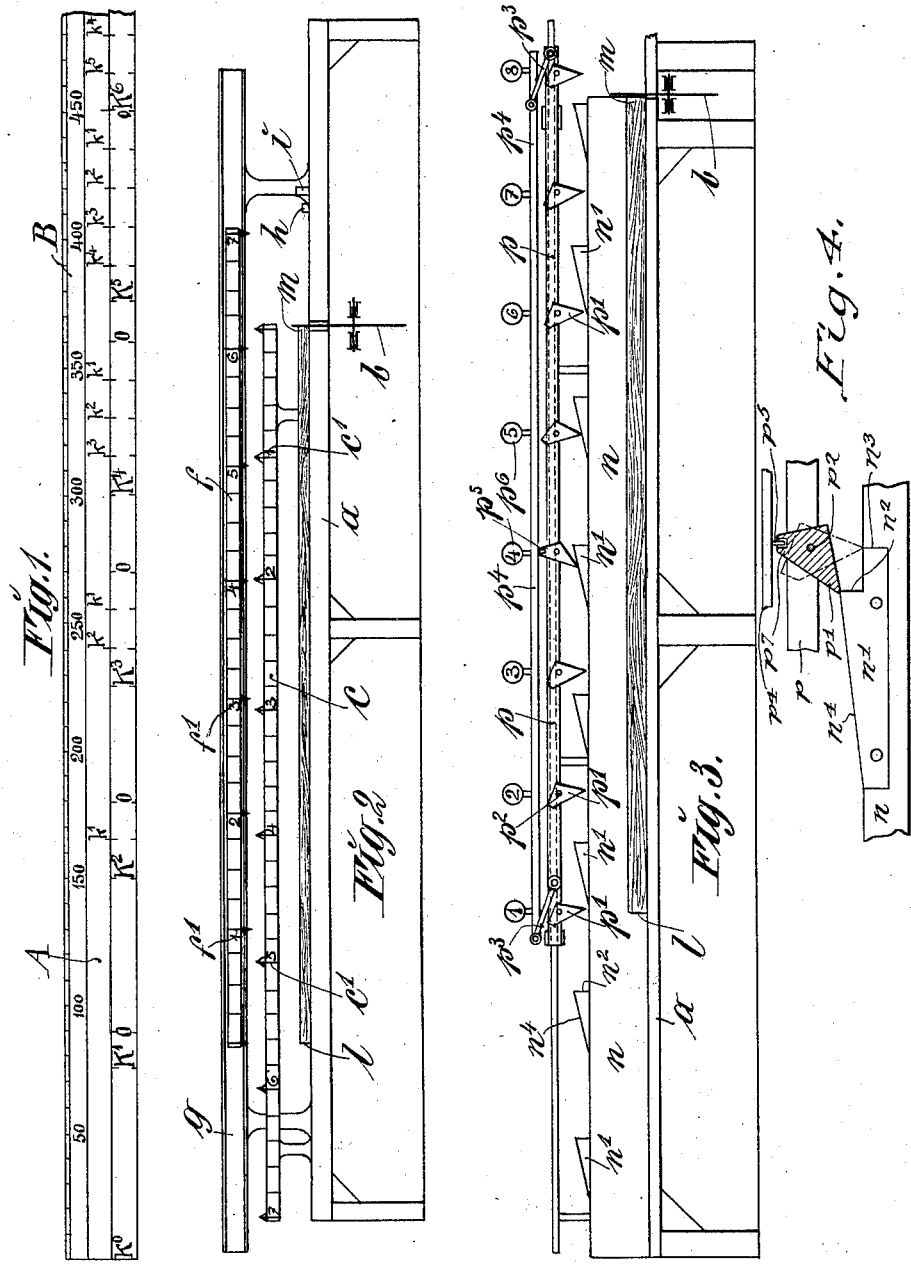

UNITED STATES PATENT OFFICE.

EINAR FOLKE SÖRENSEN, OF STOCKHOLM, SWEDEN.

MEASURING DEVICE.

1,040,044.  Specification of Letters Patent.  Patented Oct. 1, 1912.

Application filed May 26, 1910. Serial No. 563,572.

*To all whom it may concern:*

Be it known that I, EINAR FOLKE SÖRENSEN, a subject of the King of Sweden, and residing at Blasicholmstorg 11, Stockholm, in the Kingdom of Sweden, have invented certain new and useful Improvements in Measuring Devices, of which the following is a specification, reference being had therein to the accompanying drawings.

When cutting logs, deals, boards and the like of different lengths into shorter pieces of fixed lengths, for instance, in the manufacture of boxes, a great loss of wood is caused by the surplus end pieces, when proceeding as hitherto. By cutting pieces of different lengths simultaneously, for instance of two special lengths, and cutting such a number of pieces of one of the said lengths or partly of one length and partly of the other, that the added lengths of the same correspond as nearly as possible with the length of the board, etc., without exceeding the same, the said loss will be reduced to a minimum. The calculation necessary for this purpose in cutting each log, board, etc., however, requires a long time.

This invention relates to a measuring device, from which can be read off directly into which pieces the board, etc., may preferably be cut in order that the loss of material caused by surplus pieces may be reduced to a minimum.

The said measuring device consists of a measure provided with division lines and figures or with any other suitable marks representing the series of different lengths and so made that it serves as a guide for the said purpose, while the board, etc., is being cut. The said series of different lengths may be indicated on a single piece of material or on a plurality of pieces used simultaneously, some examples being stated below.

The measuring device may be located on the saw-bench and be made either stationary or movable, or be provided on the bench proper.

In the accompanying drawings, Figure 1 shows a part of a measuring rod or strip provided with the said series of different lengths indicated thereon, and Fig. 2 shows two measuring rods to be used simultaneously, the said rods being shown on the saw-bench. Fig. 3 shows a device in which the reading off operation is made from signals, and Fig. 4 shows details of the device illustrated in Fig. 3.

The measuring rod A, shown in Fig. 1, is adapted for use in cutting boards, for instance, into pieces of two different lengths. A series of marks from the left end of the rod are located at a distance from each other equal to the shorter of the lengths into which the board is to be cut. The said marks are designated by $K^0$, $K'$, $K^2$, $K^3$, $K^4$ and so on. From the line $K^0$, marks are located at a distance from each other equal to the longer lengths into which the board is to be cut. All the lines last mentioned are designated by O. From the line $K'$, also toward the right, marks $k'$, $k'$, $k'$ . . . are located at the same distance from each other as the lines O just mentioned. In the same manner marks $k^2$, $k^2$, $k^2$ . . . are placed from the line $K^2$, located at the same distance from each other as the lines O. Similar marks $k^3$, $k^3$, $k^3$ . . . are placed from the line $K^3$ and so on. When using the measure, which preferably is provided with a scale B corresponding to the scale of an ordinary meter-rule, it is placed on the board, with the end, from which the series of lengths are marked out, flush with the end of the board. At the other end of the board that mark is then read off, which is located nearest to that end of the board, inside the same. The said mark indicates how many pieces of the length equal to the distance $K^0$–$K'$ are to be cut off, in order that the smallest possible loss of material may be made, when the rest of the board is cut into pieces equal to the distance O–O. If the length of the board is 390 centimeters, the line $k^4$ indicates, that four pieces of the length $K^0$–$K'$ may be cut from the board, and the rest cut into one piece of the length equal to O–O. This follows from the fact that $k^4$, by the conditions named, is just the distance of O–O from $K^4$ and hence four pieces the length of $K^0$–$K'$ will just correspond to the length of board left after one piece O–O has been removed. If the length of the board is 450 centimeters, six pieces of the length $K^0$–$K'$ may be cut from the same and so on. From any one of the lines $k'$, $k^2$ . . . a distance of another length may be marked out, designated in accordance with the line, from which it is marked out. If, for instance, from the line $k^2$, located at a distance of 240 centimeters from the end of the measuring rod, a distance of 45 centimeters is marked out, the line marked out will correspond to a length of 285 centimeters. If the board has the said length or a somewhat greater length, the said figure will indicate that two pieces of the length $K^o$–$K'$ must be cut from the board and that besides an end piece of 45 centimeters can be obtained. If generally short boards, etc., are to be cut, a few of the graduations $k'$, $k'$ ... $k^2$, $k^2$ ... $k^3$, $k^3$ ... may be sufficient, for instance only $k'$, $k'$ ... and $k^2$, $k^2$ ... may be provided on the rod. If pieces of more than two lengths are cut off from the boards, etc., the graduation is completed correspondingly. The figures or signs of each series of lengths are then preferably designated in a special manner, for instance by means of special colors.

As already stated, the series of different lengths may be provided on two measuring rods. The said rods are provided preferably on the saw bench. One of the rods is made stationary and the other movable, as shown in Fig. 2, which is a side view of a saw bench. $a$ is the saw bench and $b$ is the saw-blade. A rod $c$ extends longitudinally of the saw bench and is fixed to the same. The said rod is divided into certain lengths from the right end, which is flush with the saw blade. Another rod $f$ also extends longitudinally of the saw bench but is located in a guide rod $g$ in such manner that it can be moved forward and backward longitudinally. The rod $f$ is divided into suitable lengths from its left end. The rod $c$ is provided with a plurality of movable pointers $c'$, which can be located at the desired distances from each other, and the rod $f$ is provided with similar pointers $f'$. Two stops $h$, $i$ of different heights are provided on the bench and movable longitudinally of the same. The lower stop $h$ is adapted for the cutting of the board into shorter pieces, and the other stop $i$ is adapted for the cutting into longer pieces. If, for instance, the board is to be cut into pieces of two different lengths of 75 and 90 centimeters respectively, the pointers $f'$, which are numbered, are fixed on the rod $f$ at the distances of 75, 150, 225, 300, 375 centimeters respectively and so on from the left end of the rod, while the pointers $c'$ are fixed on the rod $c$ at the distances of 90, 180, 270, 360 centimeters respectively and so on from the right end of the rod. The stops $h$ and $i$ are fixed at the distances of 75 and 90 centimeters respectively from the saw blade $b$.

The boards to be cut are placed on the saw bench in the same manner as the board $l$ $m$, shown in Fig. 2, and are cut even at the ends. The rod $f$ is moved in the meantime by an assistant toward the left, until its left end is flush with the left end $l$ of the board. The operator now reads off the number of that pointer of the rod $f$, which is located nearest behind one of the pointers of the stationary rod $c$ with regard to the saw-blade, consequently No. 4 in the case illustrated in Fig. 2. The operator therefore cuts off four pieces from the board having the length of 75 centimeters and cuts the rest of the board into pieces of a length of 90 centimeters, two such pieces being obtained. Only a very short useless surplus piece will then remain. If pieces of more than two lengths are to be cut off, a distance corresponding to the third length may be marked out from any pointer of one of the rods. A piece corresponding to the said distance will then be obtained at the cutting operation, in analogy with the above statements with regard to the single measuring rod, shown in Fig. 1. Special scales for the third or fourth lengths may on the other hand be provided on one of the rods or on both the rods, which scales preferably are designated differently for instance by different colors.

Instead of pointers, electric contacts or any other suitable means may be provided for indicating how many pieces of the one length or the other are to be cut off, the said means being so arranged that the operator can easily make the reading off operation at a comparatively great distance from the rod. Means of the said type are shown in Figs. 3 and 4. $n$ is a stationary rod and $p$ a movable rod. The rod $n$ is provided with projections $n'$, consisting of blocks fixed to the rod. One of the said blocks is located at the right end of the rod, the end of the block being flush with the saw-blade. The other blocks are located at distances from each other corresponding to one of the lengths to be cut off. Fig. 4 shows one of the blocks on a greater scale. The block has an abrupt offset $n^2$, located near the right end $n^3$ of the block. The top side $n^4$ of the block inclines backward from the saw-blade. Small levers $p'$ are pivoted to the rod $p$ at distances from each other, starting from the left end of the rod, which correspond to the other length, into which the board is to be cut. Each of the said levers can swing around a horizontal pin $p^2$ and the center of gravity of the lever is situated below the said pin, so that the lever always tends to occupy a vertical position. The lever is so shaped that its top arm $p^7$ has a lateral direction, when the lever hangs freely on the pin, so that the said arm $p^7$ is raised and located above the pin $p^2$, as the lever is swung by the blocks as stated below. The rod $p$ is located at such a height above the rod $n$, that the lever $p'$ is swung in the said manner by the lower end of the lever, formed to an edge or a point, striking the inclined top side $n^4$ of the block and slides up the same, as the rod $p$ is moved toward the right, Fig. 3. A rod $p^4$, parallel to the rod $p$ and located above the levers $p'$, is connected with the rod $p$ by means of arms $p^3$, pivoted to the said rods, so that the rod $p^4$ can be raised and lowered and in all positions is parallel to the rod $p$. Each lever $p'$ is connected with an electric circuit and provided with a push button $p^5$, which is located in the end of the arm $p^7$ and when forced inward causes an electric incandescent lamp $p^6$ to be lighted. The said lamps $p^6$ are located on the rod $p^4$, above the levers respectively and numbered, as shown.

The board or the like to be cut into pieces is placed on the saw-bench and cut even at its end. The rod $p$ is then moved toward the right, Fig. 3, until its left end is flush with the left end of the board. The lever $p'$, the pin of which is located nearest behind one of the offsets $n^2$, has then been rotated through the greatest angle compared with the other levers $p'$, and the end of its top arm $p^7$ occupies a higher position than the ends of the other arms $p^7$. The rod $p^4$, supported by springs or the like not shown, is then lowered and forces the button of the said lever $p'$ inward, the corresponding lamp being consequently lighted. From the number of the said lamp the operator can conclude how many pieces of the length marked on the rod $p$ are to be cut off in order that when the rest of the board is cut to the length marked out on the stationary rod $n$, the remaining part of the board may be as short as possible.

It appears from the forms of execution shown in Figs. 2 to 4 inclusive that the graduation as a whole represented, if necessary, by pointers, special signal devices and the like, must not necessarily be provided on one and the same rod or the like but may be divided into two rods or the like.

What I claim is:

1. A measuring device for cutting material into pieces, comprising a suitable base, a plurality of series of marks on the base, the marks in one series being placed at distances apart different from the marks of another series and a reading scale having a plurality of points of origin at successive marks of one of the series of marks.

2. A measuring device for cutting material into pieces, comprising a suitable base, a plurality of series of marks on the base, the marks of one series being located at distances apart different from the marks of another series, and differentiated therefrom, and a reading scale having divisions corresponding to the distances of one of said series of marks and indicators relating to the distances of another series.

In testimony whereof I have affixed my signature in presence of two witnesses.

EINAR FOLKE SÖRENSEN.

Witnesses:
 NORVALD NYSTROM,
 ROBERT APELGREN.

---

Copies of this patent may be obtained for five cents each, by addressing the "Commissioner of Patents, Washington, D. C."